United States Patent
Shih et al.

(10) Patent No.: US 9,531,283 B2
(45) Date of Patent: Dec. 27, 2016

(54) POWER SUPPLY APPARATUS

(71) Applicant: FSP TECHNOLOGY INC., Taoyuan County (TW)

(72) Inventors: Yung-Hsiang Shih, Taoyuan County (TW); Kun-Feng Hsu, Taoyuan County (TW)

(73) Assignee: FSP TECHNOLOGY INC., Taoyuan (TW)

( * ) Notice: Subject to any disclaimer, the term of this patent is extended or adjusted under 35 U.S.C. 154(b) by 436 days.

(21) Appl. No.: 14/306,256

(22) Filed: Jun. 17, 2014

(65) Prior Publication Data
US 2014/0375127 A1   Dec. 25, 2014

Related U.S. Application Data

(60) Provisional application No. 61/837,648, filed on Jun. 21, 2013.

(51) Int. Cl.
*H02M 3/335*  (2006.01)
*G06F 1/26*  (2006.01)
*H02M 1/00*  (2006.01)

(52) U.S. Cl.
CPC ............ *H02M 3/33561* (2013.01); *G06F 1/26* (2013.01); *H02M 2001/0032* (2013.01); *Y02B 70/16* (2013.01); *Y10T 307/406* (2015.04)

(58) Field of Classification Search
CPC .................................................. H02J 2001/008
USPC ......................................................... 307/43
See application file for complete search history.

*Primary Examiner* — Robert Deberadinis
(74) *Attorney, Agent, or Firm* — Jianq Chyun IP Office

(57) ABSTRACT

A power supply apparatus including a multi-outputs power supply circuit and a first regulating circuit is provided. The multi-outputs power supply circuit has a plurality of output terminals. The multi-outputs power supply circuit provides a first voltage from one output terminal among the output terminals and provides a second voltage from another one output terminal among the output terminals, where a rated voltage value of the first voltage is greater than a rated voltage value of the second voltage. The first regulating circuit is coupled between the one output terminal and the another one output terminal, where the first regulating circuit is enabled when the first voltage exceeds a first threshold, and begins to regulate the second voltage after being enabled.

11 Claims, 3 Drawing Sheets

POWER SUPPLY APPARATUS

CROSS-REFERENCE TO RELATED APPLICATION

This application claims the priority benefits of U.S. provisional application serial No. 61/837,648, filed on Jun. 21, 2013. The entirety of the above-mentioned patent applications is hereby incorporated by reference herein and made a part of this specification.

BACKGROUND OF THE INVENTION

Field of the Invention

The invention relates to a power supply apparatus, and more particularly, relates to a power supply apparatus capable of regulating voltage when offset loading occurs on outputs.

Description of Related Art

In order to provide operating power required by circuit elements inside a computer, mainboards inside the computer are connected to a power supply apparatus. The power supply apparatus may convert AC power into DC power for providing to the mainboards and the peripheral devices of the computer. The current power supply apparatus generally supports a power supply specification known as advanced technology extended (ATX), which is capable of providing a plurality of output voltages with different levels (e.g., +3.3V, +5V, +12V, −5V, −12V), so as to satisfy operation demands for the circuit elements inside the computer.

However, when an offset loading (i.e., a state in which one load corresponding one output voltage is operated in light load (the load operated in small current) while another load is operated in heavy load (the load is operated in large current)) occurs, the power supply apparatus capable of providing the output voltages is generally prone to problem of offset on the output voltages. In other words, when one of said output voltages is raised or dropped, other output voltages may be correspondingly dropped or raised due to influences from said one output voltage. For example, when an output having a rated voltage value being 12V is operated in light load (e.g., current being 1 A), the output voltage thereof may be raised to 12.5V, such that the output voltage of another output having a rated voltage value being 5V may be dropped to 4.5V. The offset on the output voltage may result in that the power supply apparatus fails to meet a required power supply specification when the offset loading occurs.

In conventional technology, said problem of offset on the output voltages is usually solved by connecting resistors in parallel on each of output terminals. Nevertheless, such method merely reduces a voltage on each of the output terminals through a passive circuit architecture, rather than correspondingly adjust the output voltages according to voltage variation at each of the output terminals. In addition, because power loss may occur on the power supply apparatus when connecting the resistors in parallel on the output terminals of the power supply apparatus, an overall power supply efficiency of the power supply apparatus may be affected if said traditional method is adopted to solve the problem of offset on the output voltages when the offset loading occurs.

SUMMARY OF THE INVENTION

A power supply apparatus is proposed according to the invention, capable of regulating each of outputs while the offset loading occurs, so that each of the outputs of the power supply apparatus may still meet the required power supply specification without substantially reducing the power supply efficiency.

The power supply apparatus of the invention includes a multi-outputs power supply circuit and a first regulating circuit. The multi-outputs power supply circuit has a plurality of output terminals. The multi-outputs power supply circuit provides a first voltage from one output terminal among the output terminals and provides a second voltage from another one output terminal among the output terminals, where a rated voltage value of the first voltage is greater than a rated voltage value of the second voltage. The first regulating circuit is coupled between the one output terminal and the another one output terminal, where the first regulating circuit is enabled when the first voltage exceeds a first threshold, and begins to regulate the second voltage after being enabled.

In an embodiment of the invention, the first regulating circuit includes a first voltage division unit and a first DC-to-DC converting unit. The first voltage division unit is configured to perform a voltage division to the first voltage to generate a first voltage division signal. The first DC-to-DC converting unit receives the first voltage, and is coupled to the first voltage division unit to receive the first voltage division signal. Therein, when the first voltage exceeds the first threshold, the first DC-to-DC converting unit is enabled in response to the first voltage division signal, so as to convert the first voltage into a first regulating voltage for providing to the another one output terminal, thereby increasing the second voltage provided by the another one output terminal.

In an embodiment of the invention, the first voltage division unit includes a first resistor and a second resistor. A first terminal of the first resistor receives the first voltage. A first terminal of the second resistor is coupled to a second terminal of the first resistor, and a second terminal of the second resistor is coupled to a reference potential.

In an embodiment of the invention, the first DC-to-DC converting unit includes a DC-to-DC converting chip and a resonant circuit. The DC-to-DC converting chip includes an enable pin and an output pin. The enable pin is coupled to the second terminal of the first resistor and the first terminal of the second resistor. The resonant circuit is coupled between the output pin and the another one output terminal. Therein, the resonant circuit is charged/discharged in response to switching of the DC-to-DC converting chip, thereby converting the first voltage into the first regulating voltage for providing to the another one output terminal.

In an embodiment of the invention, the DC-to-DC converting chip includes a switch. The switch is coupled to the enable pin and the output pin of the DC-to-DC converting chip.

In an embodiment of the invention, the first regulating circuit includes a regulating chip and a first plug-in circuit. The regulating chip includes a regulating input pin, a regulating output pin and a ground pin. The regulating input pin is coupled to the one output terminal, and the regulating output pin is coupled to the another output terminal. The first plug-in circuit is coupled among the regulating input pin, the regulating output pin and the ground pin. Therein, the regulating chip of a first transistor-type is enabled when a voltage difference between the regulating input pin and the regulating output pin exceeds a first set value, and begins to regulate the second voltage after being enabled.

In an embodiment of the invention, the regulating chip includes a switch and a DC-to-DC converting circuit. The switch is turned on after the regulating chip is enabled, and the DC-to-DC converting circuit converts the first voltage into the first regulating voltage for providing to the another one output terminal after the switch is turned on.

In an embodiment of the invention, the first plug-in circuit includes a Zener diode, a third resistor, a fourth resistor, a fifth resistor, a sixth resistor and a diode. A cathode terminal of the Zener diode is coupled to the regulating input pin. A first terminal of the third resistor is coupled to an anode terminal of the Zener diode. A first terminal of the fourth resistor is coupled to a second terminal of the third resistor, and a second terminal of the fourth resistor is coupled to the ground pin. A first terminal of the fifth resistor is coupled to the ground pin and the second terminal of the fourth resistor, and a second terminal of the fifth resistor is coupled to the regulating output pin. A first terminal of the sixth resistor is coupled to a second terminal of the fourth resistor, and a second terminal of the sixth resistor is coupled to a reference potential. An anode terminal of the diode is coupled to the first terminal of the sixth resistor, and a cathode terminal of the diode is coupled to the reference potential.

In an embodiment of the invention, the multi-outputs power supply circuit further provides a third voltage from yet another output terminal among the output terminals, and a rated voltage value of the third voltage is different from the rated voltage values of the first voltage and the second voltage. The power supply apparatus further includes a second regulating circuit. The second regulating circuit is coupled between the one output terminal and the yet another one output terminal. Therein, the second regulating circuit is enabled when the first voltage exceeds a second threshold, and begins to regulate the third voltage after being enabled.

In an embodiment of the invention, the multi-outputs power supply circuit is adapted to supply power to a first load from the one output terminal, supply power to a second load from the another one output terminal, and supply power to a third load from the yet another output terminal.

In an embodiment of the invention, the first regulating circuit and the second regulating circuit are disposed in the power supply apparatus by using one of following disposition methods: directly disposing the first regulating circuit and the second regulating circuit on a main circuit board corresponding to the power supply apparatus; disposing the first regulating circuit and the second regulating circuit on another circuit board to be plugged into the main circuit board corresponding to the power supply apparatus; and disposing the first regulating circuit and the second regulating circuit on the another circuit board to be plugged into a connector cable outside the power supply apparatus.

Based on above, the power supply apparatus provided according to the embodiments of the invention is capable of enabling the regulating circuit when the offset loading occurs on the multi-outputs power supply circuit, so as to regulate each of the output voltages of the multi-outputs power supply circuit at the same time. Therein, the power supply efficiency of the power supply apparatus will not be reduced because the regulating circuit is implemented by utilizing the active circuit architecture.

Further, the regulating circuit is capable of being enabled only when the offset loading occurs, which will not cause the overall power consumption of the power supply apparatus to be substantially increased.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
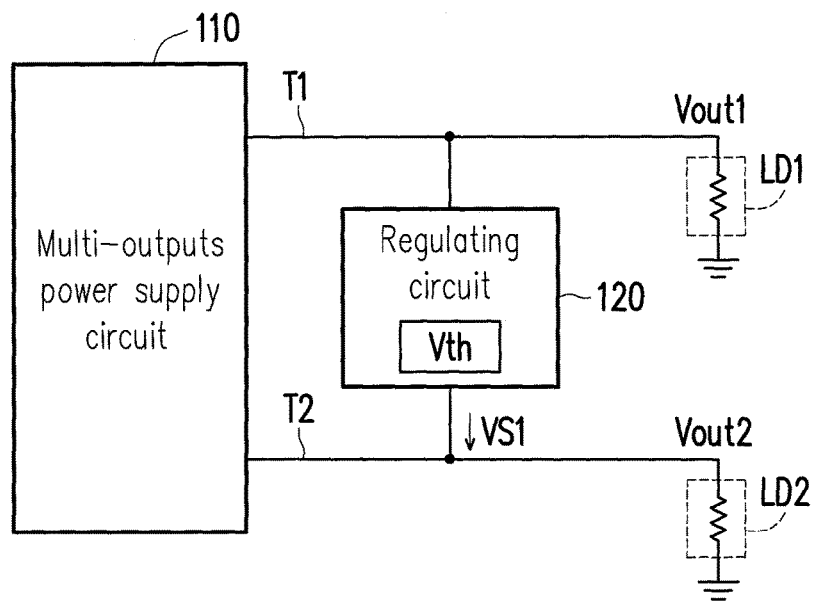
FIG. 1 is a schematic diagram of a power supply apparatus according to an embodiment of the invention.

A power supply apparatus is proposed according to embodiments of the invention, and capable of regulating each of outputs while the offset loading occurs, so that each of the outputs of the power supply apparatus may still meet the required power supply specification without substantially reducing the power supply efficiency. In order to make content of the present disclosure more comprehensible, embodiments are described below as the examples to prove that the present disclosure can actually be realized. Moreover, elements/components/steps with same reference numerals represent same or similar parts in the drawings and embodiments.

FIG. 1 is a schematic diagram of a power supply apparatus according to an embodiment of the invention. Referring to FIG. 1, a power supply apparatus 100 includes a multi-outputs power supply circuit 110 and a regulating circuit 120. The multi-outputs power supply circuit 110 includes a plurality of output terminals (only output terminals T1 and T2 are illustrated in the invention for example, but the invention is not limited thereto). Therein, the multi-outputs power supply circuit 110 is adapted to couple to corresponding loads LD1 and LD2 through the output terminals T1 and T2, respectively. The regulating circuit 120 is coupled between the output terminals T1 and T2, so as to regulate each of the outputs when the offset loading occurs on the multi-outputs power supply circuit 110.

In the present embodiment, the multi-outputs power supply circuit 110 provides a first voltage Vout1 from the output terminal T1 for the load LD1, and provides a second voltage Vout2 being different from the first voltage Vout1 for the load LD2. The regulating circuit 120 may determine whether the offset loading occurs on the outputs of the multi-outputs power supply circuit 110 according to magnitude of the first voltage Vout1, thereby deciding whether to be enabled to perform actions of regulating. Herein, the multi-outputs power supply circuit 110 may be, for example, a host power supply of an electronic apparatus (e.g., a notebook computer, an ultrabook computer, a tablet computer or a desktop computer). A rated voltage value of the first voltage Vout1 provided by the multi-outputs power supply circuit 110 is greater than a rated voltage value of the second voltage Vout2. Therein, the rated voltage value of the first voltage Vout1 is, for example, 12V, and the rated voltage value of the second voltage Vout2 is, for example, 5V or 3.3V, but the invention is not limited thereto. In addition, the load LD1 of the present embodiment may be a circuit unit applying the first voltage Vout1 in the electronic apparatus (e.g., a PCI-E bus, a CPU and a display card, which apply 12V voltage), and the load LD2 may be a circuit unit applying the second Vout2 in the electronic apparatus (e.g., a hard drive, a disc player and a fan, which apply 5V voltage; or a PCI bus, a south bridge chip and a network chip, which apply 3.3V voltage), but the invention is not limited thereto either.

Specifically, in state of the offset loading, offset may occur on the first voltage Vout1 and the second voltage Vout2 provided by the multi-outputs power supply circuit 110, resulting that the power supply apparatus 100 fails to meet the required power supply specification required by the loads LD1 and LD2 (e.g., the specification for the offset of the rated voltages or specification for the power supply efficiency). For instance, when the load LD1 is operated in light load and the load LD2 is operated in heavy load, the first Vout1 may be raised and the second voltage Vout2 may be dropped; on the contrary, when the load LD1 is operated in heavy load and the load LD2 is operated in light load, the first voltage Vout1 may be dropped and the second voltage Vout2 may be raised.

In other words, in case the regulating circuit 120 is not enabled/activated, one of the first voltage Vout1 and the second voltage Vout2 is raised to exceed the corresponding rated voltage value due to the offset loading, and then another one of the first and second voltages is relatively dropped to be lower than the corresponding regulating circuit value. Taking the rated voltage values of the first voltage Vout1 and the second voltage Vout2 respectively being 12V and 5V for example, when the first voltage Vout1 is raised to 12.5V due to the offset loading, the second voltage Vout2 is relatively dropped to 4.5V.

In order to solve the problem of offset on the output voltage due to the offset loading, the regulating circuit 120 according to the present embodiment of the invention is enabled when the first voltage Vout1 exceeds a threshold Vth (which indicates that the offset loading occurs on the outputs of the multi-outputs power supply circuit 110 at the time), and begins to regulate the second voltage Vout2 after being enabled. Taking the load LD1 operated in light load and the load LD2 operated in heavy load for example, the regulating circuit 120 is enabled when the first voltage Vout1 is raised to exceed the threshold Vth and begins to regulate the second voltage Vout2, so that the second voltage Vout2 will not be lower than the rated voltages value of its own due to the offset loading (that is, to maintain the second voltage Vout2 in a specified range).

For instance, taking the rated voltage values of the first voltage Vout1 and the second voltage Vout2 respectively being 12V and 5V for example. If the threshold Vth is set to be 12.4V, the regulating circuit 120 is then enabled when the first voltage Vout1 is raised to 12.4V and begins to regulate the second voltage Vout2, so as maintain the second voltage Vout2 at 5V. At the time, the regulating circuit 120 that suppresses dropping of the second voltage Vout2 and also suppress raising of the first voltage Vout1, such that the first voltage Vout1 and the second voltage Vout2 may both be stably maintained at the rated voltage values of their own (that is, the first voltage Vout1 and the second voltage Vout2 are respectively maintained at the specified range).

On the other hand, if the first voltage Vout1 does not exceed the threshold (which indicates that the offset loading does not occur on the outputs of the multi-outputs power supply circuit 110 at the time), the regulating circuit 120 is maintained at a disabled state so as to reduce/prevent unnecessary power consumption.

In comparison with an offset loading regulation mechanism in which false loads are connect in parallel on the output terminal T1/T2 of the multi-outputs power supply circuit 110, the regulating circuit 120 according to the present embodiment of the invention may be implemented by utilizing an active circuit architecture, thus the power supply efficiency of the power supply apparatus 100 may not be reduced. Further, the regulating circuit 120 according to the present embodiment of the invention is capable of being enabled only when the offset loading occurs, which will not cause an overall power consumption of the power supply apparatus 100 to be substantially increased.

Possible implementations for the regulating circuit 120 according to the present embodiment of the invention are further described below with reference to examples depicted in FIG. 2 and FIG. 3.

Figure 2:
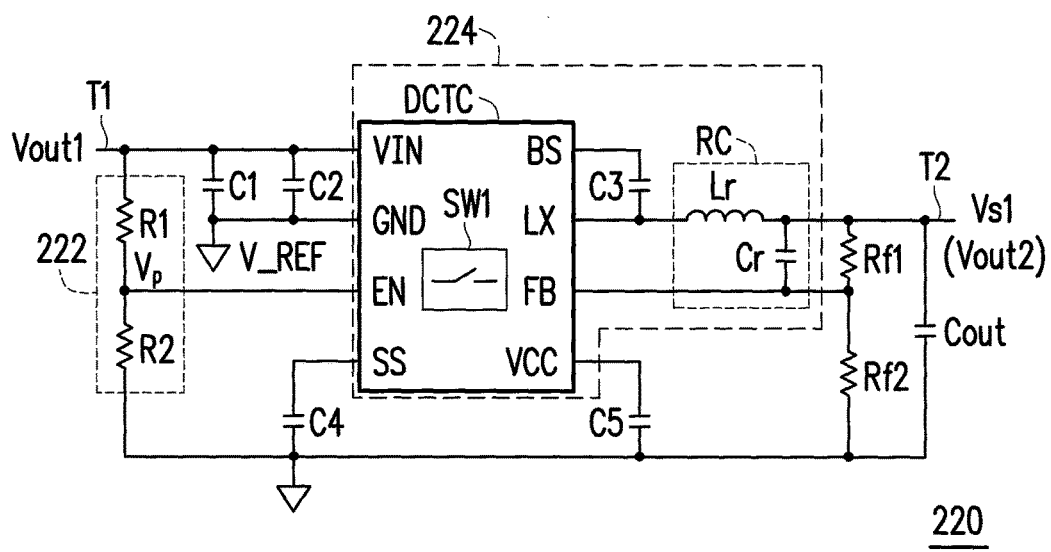
FIG. 2 is a schematic diagram of a regulating circuit according to an embodiment of the invention.

First, referring to FIG. 1 and FIG. 2 together, in which FIG. 2 is a schematic diagram of a regulating circuit according to an embodiment of the invention. A regulating circuit 220 of the present embodiment is applicable on the power supply apparatus 100, which includes a voltage division unit 222 and a DC-to-DC converting unit 224. The voltage division unit 222 is configured to perform a voltage division to the first voltage Vout1 to generate a voltage division signal Vp. The DC-to-DC converting unit 224 is coupled to the voltage division unit 222 to receive the voltage division signal Vp, and determines whether the first voltage Vout1 exceeds the threshold Vth according to the voltage division signal Vp, thereby deciding whether to be enabled or not.

Therein, if the first voltage Vout1 exceeds the threshold Vth, the DC-to-DC converting unit 224 is enabled in response to the voltage division signal Vp to begin a boosting/bucking voltage conversion to the received first voltage Vout1, so as to convert the first voltage Vout1 into a first regulating voltage Vs1, thereby increasing the second voltage Vout2 provided by the output terminal T2 of the multi-outputs power supply circuit 110. In other words, a current that flows through the load LD2 at the time is provided by both the multi-outputs power supply circuit 110 and the DC-to-DC converting unit 224. On the contrary, if the first voltage Vout1 does not exceed the threshold Vth, the DC-to-DC converting unit 224 is not enabled. In other words, a current that flows through the load LD2 at the time is provided by the multi-outputs power supply circuit 110 alone.

In the present exemplary embodiment, the voltage division unit 222 may be realized by resistors R1 and R2, and the DC-to-DC converting unit 224 may be realized by utilizing a circuit architecture constituted by a DC-to-DC converting chip DCTC and a resonant circuit RC. Therein, the DC-to-DC converting chip DCTC may include, for example, a power pin VIN, a ground pin GND, an enable pin EN, a soft-start pin SS, a bootstrap pin BS, an output pin LX, a feedback pin FB and a reference pin VCC (but the invention is not limited thereto; function of each pin may refer to specification for a general DC-to-DC converting chip, which is omitted hereinafter). The resonant circuit RC may be, for example, constituted by a resonant inductor Lr and a resonant capacitor Cr. In addition, plug-in circuit elements (e.g., capacitors C1 to C5, Cout, and resistors Rf1 and Rf2) of each pin of the DC-to-DC converting chip DCTC are arranged as depicted in FIG. 2, so as to facilitate in operations of the DC-to-DC converting chip DCTC. However, the invention is not limited thereto.

More specifically, in the regulating circuit 220, a first terminal of the resistor R1 receives the first voltage Vout1. A first terminal of the resistor R2 is coupled to a second terminal of the resistor R1 (i.e., a voltage division point of the voltage division unit 222), and a second terminal of resistor R2 is coupled to a reference potential V_REF. The power pin VIN of the DC-to-DC converting chip DCTC receives the first voltage Vout1 from the output terminal T1. The ground pin GND is coupled to the reference potential V_REF. The enable pin EN is coupled to the voltage division point of the voltage division unit 222 to receive the voltage division signal Vp (a voltage on the voltage division point). The soft-start pin SS is coupled to the reference potential V_REF through the capacitor C4. The bootstrap pin BS is coupled to the output pin LX through the capacitor C3. The output pin LX is coupled to the output terminal T2 of the multi-outputs power supply circuit 110 through the resonant circuit RC. The feedback pin FB is coupled to a common node of the resistors Rf1 and Rf2. The reference pin VCC is coupled to the reference potential V_REF through the capacitor C5.

In the resent embodiment, if the first voltage Vout1 is greater than the threshold Vth, the DC-to-DC converting chip DCTC is enabled in response to the voltage division signal Vp on the enable pin EN, and begins to output the first voltage Vout1 by switching manner, so that the resonant circuit RC is charged/discharged in response to switching of voltage on the output pin LX thereby generating the first regulating voltage Vs1. Otherwise, if the first voltage Vout1 is less than the threshold Vth, the DC-to-DC converting chip DCTC is not enabled. Accordingly, the regulating circuit 220 of the present embodiment is capable of realizing the function of regulating the second voltage Vout2 only when the offset loading occurs on the multi-outputs power supply circuit 110. It should be noted that, in an exemplary embodiment, the DC-to-DC converting chip DCTC may include a switch SW1 coupled to the enable pin EN and the output pin LX. The DC-to-DC converting chip DCTC is capable of realizing operation of outputting the first voltage Vout1 by switching manner through controlling on/off state of the switch SW1.

Figure 3:
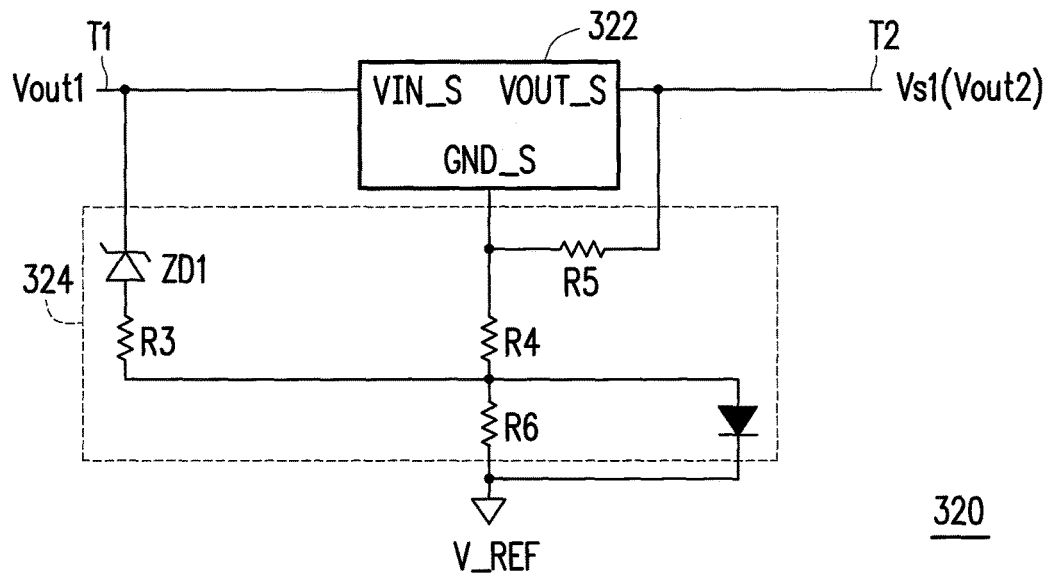
FIG. 3 is a schematic diagram of a regulating circuit according to another embodiment of the invention.

Referring to FIG. 1 and FIG. 3 together, in which FIG. 3 is a schematic diagram of a regulating circuit according to another embodiment of the invention. A regulating circuit 320 of the present embodiment is also applicable on the power supply apparatus 100, which includes a regulating chip 322 and a plug-in circuit 324. The regulating chip 322 is, for example, a regulating chip of transistor-type, which includes a regulating input pin VIN_S, a regulating output pin VOUT_S and a ground pin GND_S. The regulating input pin VIN_S of the regulating chip 322 is coupled to the output terminal T1 of the multi-outputs power supply circuit 110, and the regulating output pin VOUT_S thereof is coupled to the output terminal T2 of the multi-outputs power supply circuit 110. The plug-in circuit 324 is coupled among the regulating input pin VIN_S, the regulating output pin VOUT_S and the ground pin GND_S.

In the present exemplary embodiment, the regulating chip 322 of transistor-type is, for example, a low dropout linear (LDO) chip which compares a voltage difference between the regulating input pin VIN and the regulating output pin VOUT as a basis of determining whether to be enabled or not. In addition, the plug-in circuit 324 may be, for example, realized by a circuit constituted by a Zener diode ZD1, a diode D1 and resistors R3 to R6. However, the invention is not limited thereto.

Specifically, in the regulating circuit 320, a cathode terminal of the Zener diode ZD1 is coupled to the regulating input pin VIN_S of the regulating chip 322. A first terminal of the resistor R3 is coupled to an anode terminal of the Zener diode ZD1. A first terminal of the resistor R4 is coupled to a second terminal of the resistor R3, and a second terminal of the resistor R4 is coupled to the ground pin GND_S. A first terminal of the resistor R5 is coupled to the ground pin GND_S and the second terminal of the resistor R4, and a second terminal of the resistor R5 is coupled to the regulating output pin VOUT_S of the regulating chip 322. A first terminal of the resistor R6 is coupled to the second terminal of the resistor R4, and a second terminal of the resistor R6 is coupled to the reference potential V_REF. An anode terminal of the diode D1 is coupled to the first terminal of the resistor R6, and a cathode terminal of the diode D1 is coupled to the reference potential V_REF.

In the present embodiment, the regulating chip 322 is enabled when a voltage difference between the regulating input pin VIN_S and the regulating output pin VOUT_S (i.e., the voltage difference between the first voltage Vout1 and the second voltage Vout2) exceeds a set value, and begins to regulate the second voltage Vout2 after being enabled. In other words, the regulating chip 322 may determine whether the first voltage Vout1 exceeds the threshold Vth according to said set value.

Taking the rated voltage values of the first voltage Vout1 and the second voltage Vout2 respectively being 12V and 5V for example. In case the multi-outputs power supply circuit 110 is not in state of the offset loading, the voltage difference between the regulating input pin VIN_S and the regulating output pin VOUT_S of the regulating chip 322 should ideally be 7V. When the offset loading occurs on the multi-outputs power supply circuit 110, the voltage difference between the regulating input pin VIN_S and the regulating output pin VOUT_S is relatively increased from, for example, 7V to 8V (e.g., the first voltage Vout1 is raised from 12V to 12.5 V, and the second voltage Vout2 is dropped from the 5V to 4.5V). In this case, designers only need to set the set value of the regulating chip 322 to be 7.8V, such that the regulating chip 322 may be enabled when the first voltage Vout1 is raised to 12.4V (meanwhile, the second voltage Vout2 is relatively dropped to 4.6V), thereby pulling the first voltage Vout1 and the second voltage Vout2 respectively back to 12V and 5V which are the rated voltage values. Otherwise, if the voltage difference between the regulating input pin VIN_S and the regulating output pin VOUT_S does not exceed said set value, the regulating chip 322 is not enabled. Accordingly, the regulating circuit 320 of the present embodiment is capable of realizing the function of regulating the second voltage Vout2 only when the offset loading occurs on the multi-outputs power supply circuit 110.

Figure 4:
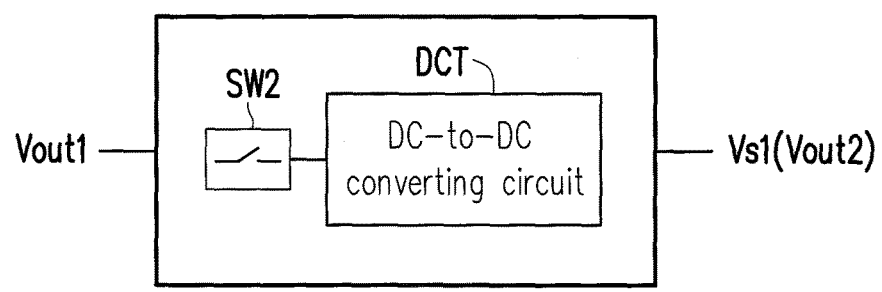
FIG. 4 is a schematic diagram of a regulating chip of FIG. 3 according to an embodiment of the invention.

Furthermore, in an exemplary embodiment, as shown in FIG. 4. The regulating chip 322 may be realized by an architecture including a switch SW2 and a DC-to-DC converting circuit DCT. Therein, the switch SW2 is turned on after the regulating chip 322 is enabled, so that the DC-to-DC converting circuit DCT may convert the first voltage Vout1 into the first regulating voltage Vs1 for providing to the output terminal T2 in response to the switch SW2 being turned on.

Figure 5:
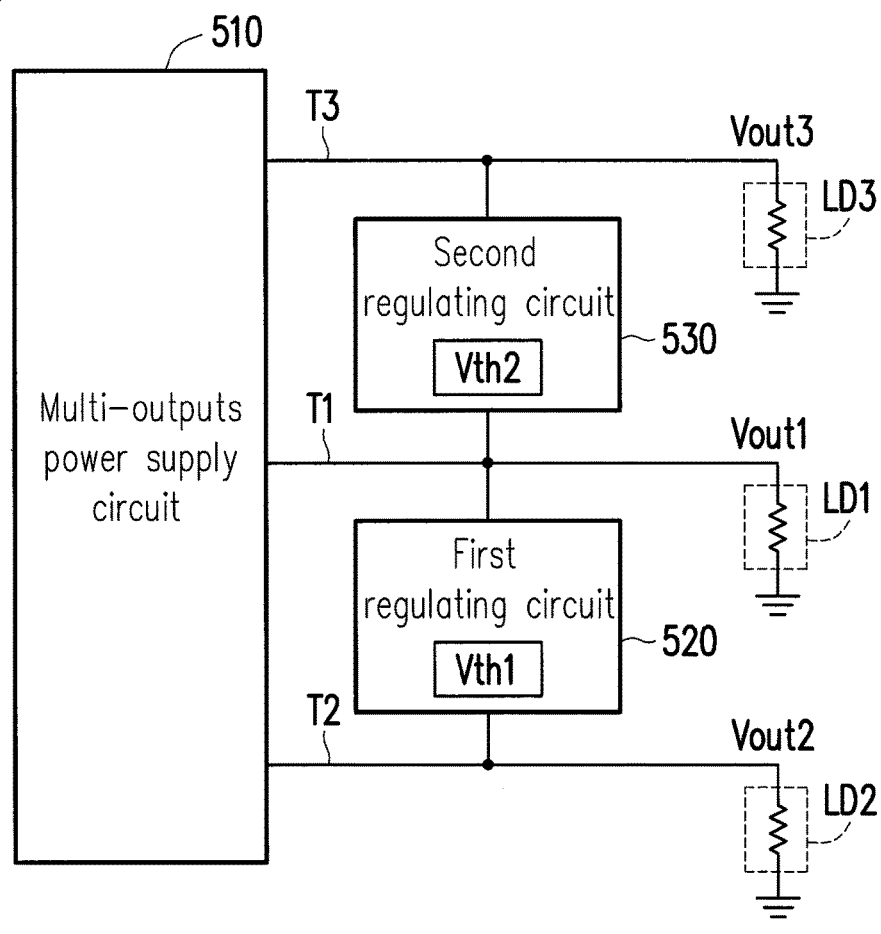
FIG. 5 is a schematic diagram of a power supply apparatus according to another embodiment of the invention.

FIG. 5 is a schematic diagram of a power supply apparatus according to another embodiment of the invention. Referring to FIG. 5, a power supply apparatus 500 includes a multi-outputs power supply circuit 510, a first regulating circuit 520 and a second regulating circuit 530. More specifically, the present embodiment is substantially similar to aforesaid embodiment of FIG. 1. A difference between the two embodiments of FIGS. 1 and 5 is that, besides providing the first voltage Vout1 and the second voltage Vout2 respectively provided from the output terminals T1 and T2, the multi-outputs power supply circuit 510 may further provide a third voltage Vout3 from an output terminal T3, which is different from the first voltage Vout1 and the second voltage Vout2. Herein, the rated voltage values of the first voltage Vout1, the second voltage Vout2 and the third voltage Vout3 are 12V, 5V and 3.3.V, respectively.

Accordingly, in addition to the first regulating circuit 520 configured to regulate the first voltage Vout1 and the second voltage Vout2 (i.e., which is identical to the regulating circuit 110 in the embodiment of FIG. 1), the power supply apparatus 500 of the present embodiment further includes the second regulating circuit 530 configured to regulate the first voltage Vout1 and the third voltage Vout3. Therein, the first regulating circuit 520 may be enabled when the first voltage Vout1 exceeds a threshold Vth1, and begins to regulate the second voltage Vout2 after being enabled; whereas the second regulating circuit 530 may be enabled when the first voltage Vout1 exceeds a threshold Vth2, and begins to regulate the third voltage Vout3 after being enabled.

Herein, it should be noted that, the thresholds Vth1 and Vth2 may be set to identical or different values depending on the practice design or application requirement, which are not particularly limited by the invention. In other words, the first regulating circuit 520 and the second regulating circuit 530 may be enabled under the same condition of offset loading, so as to regulate the second voltage Vout2 and the third voltage Vout3 at the same time. Or, the first regulating circuit 520 and the second regulating circuit 530 may be enabled according to a corresponding condition of offset loading, respectively. However, the invention is not limited thereto.

In addition, designs and concepts of the first regulating circuit 520 and the second regulating circuit 530 may both refer to descriptions for the embodiments of FIG. 1 to FIG. 3, thus identical or repeated parts regarding the same are omitted hereinafter.

It should be noted that, in the foregoing embodiments, regardless of whether it is the regulating circuit 120, or the first regulating circuit 520 and the second regulating circuit 530, all of them may be: 1) directly disposed on a main circuit board corresponding to the power supply apparatus 100/500; 2) disposed on another circuit board to be plugged into the main circuit board corresponding to the power supply apparatus 100/500; or 3) disposed on the another circuit board to be plugged into a connector cable outside the power supply apparatus 100/500.

In summary, a power supply apparatus provided according to the embodiments of the invention is capable of enabling the regulating circuit only when the offset loading occurs on the multi-outputs power supply circuit, so as to regulate each of the output voltages of the multi-outputs power supply circuit at the same time. Therein, the power supply efficiency of the power supply apparatus will not be reduced because the regulating circuit is implemented by utilizing the active circuit architecture. Further, the regulating circuit is capable of being enabled only when the offset loading occurs, which will not cause the overall power consumption of the power supply apparatus to be substantially increased. Based on above, the power supply apparatus according to the embodiments of the invention is capable of providing favorable power supply efficiency as well as stable power supply performance.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A power supply apparatus, comprising:
   a multi-outputs power supply circuit having a plurality of output terminals, and the multi-outputs power supply circuit providing a first voltage from one output terminal among the output terminals and providing a second voltage from another one output terminal among the output terminals, wherein a rated voltage value of the first voltage is greater than a rated voltage value of the second voltage; and
   a first regulating circuit coupled between the one output terminal and the another one output terminal, wherein the first regulating circuit is enabled when the first voltage exceeds a first threshold, and begins to regulate the second voltage after being enabled.

2. The power supply apparatus of claim 1, wherein the first regulating circuit comprises:
   a first voltage division unit configured to perform a voltage division to the first voltage to generate a first voltage division signal; and
   a first DC-to-DC converting unit receiving the first voltage and coupled to the first voltage division unit to receive the first voltage division signal, wherein when the first voltage exceeds the first threshold, the first DC-to-DC converting unit is enabled in response to the first voltage division signal, so as to convert the first voltage into a first regulating voltage for providing to the another one output terminal, thereby increasing the second voltage provided by the another one output terminal.

3. The power supply apparatus of claim 2, wherein the first voltage division unit comprises:
   a first resistor having a first terminal receiving the first voltage; and
   a second resistor having a first terminal coupled to a second terminal of the first resistor, and a second terminal coupled to a reference potential.

4. The power supply apparatus of claim 3, wherein the first DC-to-DC converting unit comprises:
   a DC-to-DC converting chip having an enable pin and an output pin, and the enable pin being coupled to the second terminal of the first resistor and the first terminal of the second resistor; and
   a resonant circuit coupled between the output pin and the another one output terminal, wherein the resonant circuit is charged/discharged in response to switching of the DC-to-DC converting chip, thereby converting the first voltage into the first regulating voltage for providing to the another one output terminal.

5. The power supply apparatus of claim 4, wherein the DC-to-DC converting chip comprises:
   a switch coupled to the enable pin and the output pin.

6. The power supply apparatus of claim 1, wherein the first regulating circuit comprises:
   a regulating chip having a regulating input pin, a regulating output pin and a ground pin, the regulating input pin being coupled to the one output terminal, and the regulating output pin being coupled to the another one output terminal; and
   a first plug-in circuit coupled among the regulating input pin, the regulating output pin and the ground pin, wherein the regulating chip is enabled when a voltage difference between the regulating input pin and the regulating output pin exceeds a first set value, and begins to regulate the second voltage after being enabled.

7. The power supply apparatus of claim 6, wherein the regulating chip comprises:
   a switch turned on after the regulating chip is enabled; and
   a DC-to-DC converting circuit converting the first voltage into the first regulating voltage for providing to the another one output terminal after the switch is turned on.

8. The power supply apparatus of claim 6, wherein the first plug-in circuit comprises:
   a Zener diode having a cathode terminal coupled to the regulating input pin;
   a third resistor having a first terminal coupled to an anode terminal of the Zener diode;
   a fourth resistor having a first terminal coupled to a second terminal of the third resistor, and a second terminal coupled to the ground pin;
   a fifth resistor having a first terminal coupled to the ground pin and the second terminal of the fourth resistor, and a second terminal coupled to the regulating output pin;
   a sixth resistor having a first terminal coupled to the second terminal of the fourth resistor, and a second terminal coupled to a reference potential; and
   a diode having an anode terminal coupled to the first terminal of the sixth resistor, and a cathode terminal coupled to the reference potential.

9. The power supply apparatus of claim 1, wherein the multi-outputs power supply circuit further provides a third voltage from yet another one output terminal among the output terminals, a rated voltage value of the third voltage is different from the rated voltage values of the first voltage and the second voltage, and the power supply apparatus further comprises:
   a second regulating circuit coupled between the one output terminal and the yet another one output terminal, wherein the second regulating circuit is enabled when the first voltage exceeds a second threshold, and begins to regulate the third voltage after being enabled.

10. The power supply apparatus of claim 9, wherein the multi-outputs power supply circuit is adapted to supply power to a first load from the one output terminal, supply power to a second load from the another one output terminal, and supply power to a third load from the yet another output terminal.

11. The power supply apparatus of claim 9, wherein the first regulating circuit and the second regulating circuit are disposed in the power supply apparatus by using one of following disposition methods: directly disposing the first regulating circuit and the second regulating circuit on a main circuit board corresponding to the power supply apparatus; disposing the first regulating circuit and the second regulating circuit on another circuit board to be plugged into the main circuit board corresponding to the power supply apparatus; and disposing the first regulating circuit and the second regulating circuit on the another circuit board to be plugged into a connector cable outside the power supply apparatus.

* * * * *